US010599999B2

(12) United States Patent
Huang

(10) Patent No.: US 10,599,999 B2
(45) Date of Patent: Mar. 24, 2020

(54) DIGITAL EVENT PROFILE FILTERS BASED ON COST SENSITIVE SUPPORT VECTOR MACHINE FOR FRAUD DETECTION, RISK RATING OR ELECTRONIC TRANSACTION CLASSIFICATION

(71) Applicant: Yottamine Analytics Inc., Bellevue, WA (US)

(72) Inventor: Te-Ming Huang, Bellevue, WA (US)

(73) Assignee: YOTTAMINE ANALYTICS, INC., Bellevue, WA (US)

( * ) Notice: Subject to any disclaimer, the term of this patent is extended or adjusted under 35 U.S.C. 154(b) by 507 days.

(21) Appl. No.: 15/315,689

(22) PCT Filed: May 20, 2015

(86) PCT No.: PCT/US2015/031801
§ 371 (c)(1),
(2) Date: Dec. 1, 2016

(87) PCT Pub. No.: WO2015/187372
PCT Pub. Date: Dec. 10, 2015

(65) Prior Publication Data
US 2017/0124483 A1 May 4, 2017

Related U.S. Application Data

(60) Provisional application No. 62/006,684, filed on Jun. 2, 2014.

(51) Int. Cl.
*G06N 20/00* (2019.01)
*G06F 21/55* (2013.01)
(Continued)

(52) U.S. Cl.
CPC ............. *G06N 20/00* (2019.01); *G06F 17/16* (2013.01); *G06F 21/552* (2013.01); *G06Q 30/00* (2013.01)

(58) Field of Classification Search
CPC ....... G06N 20/00; G06F 17/16; G06F 21/552; G06Q 30/00
(Continued)

(56) References Cited

U.S. PATENT DOCUMENTS 9,269,057 B1 *  2/2016  Chandra ................. G06N 20/00
2003/0078850 A1  4/2003  Hartman et al.
(Continued)

FOREIGN PATENT DOCUMENTS

CN          102651071 B     8/2012

OTHER PUBLICATIONS

Huang et al., "Kernel Based Algorithms for Mining Huge Data Sets: Supervised, Semi-supervised, and Unsupervised Learning," Springer 2006, pp. 36-43 (Year: 2006).*

(Continued)

*Primary Examiner* — Vincent Gonzales
*Assistant Examiner* — Chase P. Hinckley
(74) *Attorney, Agent, or Firm* — Pillsbury Winthrop Shaw Pittman LLP

(57) ABSTRACT

A computer system includes a device having instructions to implement a training application programming interface that is configured to receive a first set of data that includes training observable events and a model builder engine that is configured to provide estimated outcomes of said training observable events using a kernel function, wherein said kernel function is configured by a plurality of parameters including a match reference vector and a mismatch measurement vector. The model builder engine is also configured to calculate values of said mismatch measurement vector to provide a calculated mismatch measurement vector calculate a distance between the value of said match reference vector and the value of said calculated mismatch measurement vector corresponding to each training observ- (Continued)

able event. The model builder engine is also configured to determine an accuracy of said kernel function in providing estimated outcomes of said training observable events.

20 Claims, 9 Drawing Sheets

(51) Int. Cl.
    *G06Q 30/00* (2012.01)
    *G06F 17/16* (2006.01)

(58) Field of Classification Search
    USPC .......................................................... 706/12
    See application file for complete search history.

(56) References Cited

U.S. PATENT DOCUMENTS

2009/0132446 A1* 5/2009 Milenova .............. G06F 16/284
                                                            706/12
2010/0145902 A1   6/2010 Boyan et al.

OTHER PUBLICATIONS

Zhang et al., "Improved Nyström Low-Rank Approximation and Error Analysis," Jul. 5, 2008, Proceedings of the 25th International Conference of Machine Learning, pp. 1232-1239 (Year: 2008).*

Huang, T.-M., Kecman, V., & Kopriva, I. (2004). "Kernel Based Algorithms for Mining Huge Data Sets." (P.J. Kacprzyk, Ed.) Springer.

Parsa, I. (1998). KDD-CUP-98 Results. Retrieved from kdnuggets: http://www.kdnuggets.com/meetings/kdd98/kee-cup-98-results.html.

Thorsten Joachims, "A Support Vector Method for Multivariate Performance Measures," Proceedings of the 22nd International Conference on Machine Learning, Bonn, Germany, 2005.

Urban Science Inc. (1998). "Urban Science Wins the KDD-98 Cup." Retrieved from Kdnuggets: http://www.kdnuggets.com/meetings/kdd98/gain-kddcup98-release.html.

Vogt, M., & Kecman, V. (2005). Active-Set Method for Support Vector Machines. In L. Wang (Ed.), "Support Vector Machines: Theory and Applications" (vol. 177, pp. 133-178).

Zhang, K., Lan, L., Wang, Z., & Moerchen, F. (2012), "Scaling up Kernel SVM on Limited Resources: A Low-rank Linearization Approach," Proceedings of the 15th International Conference on Artificial intelligence and Statistics (AISTATS).

* cited by examiner

300 ─┐

| | |
|---|---|
| 301. | Input $\bar{x} = (x_1, \ldots, x_n)$, $\bar{y} = (y_1, \ldots, y_n)$, C, $\mathcal{E}$, $\kappa = (\kappa_1, \ldots, \kappa_n)$ |
| 302. | Transform $\kappa$ into all integer via $\kappa_i = ceil(\kappa_i/(\kappa_{min}))$ |
| 303. | Set $CC = (cc_1, \ldots, cc_n)$ | where $cc_i \begin{cases} \kappa_i \sum_{j=1,}^{\#neg} \kappa_j & \text{where } y_j = -1 \ if(y_i = 1) \\ -\kappa_i \sum_{j=1,}^{\#pos} \kappa_j & \text{where } y_j = 1 \ if(y_i = -1) \end{cases}$ where i=1,......,n and $\sum_{j=1,}^{\#neg} \kappa_j$ is sum of all $\kappa_j$ where y=-1 and where $\sum_{j=1,y_j\in-1}^{\#pos} \kappa_j$ is sum of all $\kappa_j$ where y=1. This is a crucial step.

| | |
|---|---|
| 304. | Set $\overline{CC_g} = (\overline{cc}_1, \ldots, \overline{cc}_n)$ where $\overline{cc}_l \begin{cases} -\kappa_i \sum_{j=1}^{\#neg} \kappa_j & \text{where } y_j = -1 \ if(y_i = 1) \\ \kappa_i \sum_{j=1}^{\#pos} \kappa_j & \text{where } y_j = 1 \ if(y_i = -1) \end{cases}$ | where l=1,....n.

| | |
|---|---|
| 305. | Compute base factor as $bf = (\sum_{j=1,y_j\in 1}^{\#pos} \kappa_j) * (\sum_{j=1,y_j\in-1}^{\#neg} \kappa_j)$ |
| 306. | Define g=1, $Z \leftarrow \{\}$ is an empty set, $\mathbb{C} \leftarrow \{\}$ is an empty set. |
| 307. | repeat |
| 308. | Compute Vector $z_g$ |
| 309. | $z_g = \sum_{i=1}^{n} [\frac{cc_i - \overline{cc}_i}{bf}] x_i$ |
| 310. | $Z \leftarrow Z \cup z_g$ |
| 311. | Compute Hessian matrix $H_g = Z^T Z$ |
| 312. | Compute vector $f_g$, each element of the vector is computed as $f_i = \bar{y}^T (CC - \overline{CC}_i) * \frac{0.5}{bf}$ where $i = 1 \ldots g$ |
| 313. | Compute $\alpha$ using Algorithm Active_Set with input $H_g, f_g, C, \mathcal{E}, z_g$ |
| 314. | Compute $w = \sum_{j=1}^{g} \alpha_j z_j$ |
| 315. | $\xi \leftarrow max_{\overline{CC}_g \in \mathbb{C}} \{\max\{0, \bar{y}^T (CC - \overline{CC}_g)\frac{0.5}{bf} - w^T z\}\}$ |
| 316. | Find $\overline{CC}_{g+1}$ using new Argmax Algorithm and find $z_{g+1}$ as in 309. |
| 317. | if $\bar{y}^T (CC - \overline{CC}_{g+1})\frac{0.5}{bf} - w^T z_{g+1} > \xi + \mathcal{E}$ then |
| 318. | $\mathbb{C} \leftarrow \mathbb{C} \cup \{\overline{CC}_{g+1}\}$ |
| 319. | g=g+1; |
| 320. | endif |
| 321. | until $\mathbb{C}$ no longer changed during iteration. |
| 322. | Output $w$ |

*FIG. 3*

500 

501. Input: $\{\mathcal{X} = [x_i, y_i], i = 1, \ldots, n\}$ and $\kappa = (\kappa_1, \ldots \ldots, \kappa_n)$
502. Set $\overline{CC} = \{\overline{cc}_0 \ldots \ldots \ldots \overline{cc}_n\} = 0$
503. for $i \in \{i : y_i = 1\}$ do $s_i \leftarrow -0.25 + w^T x_i$
     for $i \in \{i : y_i = -1\}$ do $s_i \leftarrow 0.25 + w^T x_i$
504. $(r_1 \ldots \ldots, r_n) \leftarrow sort\{1, \ldots, n\}$ by $s_i$
{sort the $s_i$ in descending order, and store the index $i$ into $r$}
505. for $i \in \{i : y_i = 1\}$ do $s_p$ += $\kappa_i$. Set $s_n = 0$
506. for $i \in \{1, \ldots, n\}$ do
507.     if $y_{r_i} > 0$ then
508.         $\overline{cc}_{r_i} \leftarrow (\kappa_{r_i} *\{\#neg\_exp - 2*s_n\})$
509.         $s_p \leftarrow s_p - \kappa_{r_i}$
510.     else
511.         $\overline{cc}_{r_i} \leftarrow (\kappa_{r_i} *(-\#pos\_exp + 2*s_p))$;
512.         $s_n \leftarrow s_n + \kappa_{r_i}$
513.     end if
514. end for
515. return $(\overline{cc}_1 \ldots \ldots \overline{cc}_n)$

DIGITAL EVENT PROFILE FILTERS BASED ON COST SENSITIVE SUPPORT VECTOR MACHINE FOR FRAUD DETECTION, RISK RATING OR ELECTRONIC TRANSACTION CLASSIFICATION

CROSS-REFERENCE TO RELATED APPLICATION(S)

This application is a 35 U.S.C. § 371 National Phase of International Patent Application No. PCT/US2015/031801, filed May 20, 2015 and incorporated herein by reference in its entirety, which claims the benefit of U.S. Provisional Patent Application No. 62/006,684, entitled "BUILDING OF EVENT COST SENSITIVE PREDICTIVE MODEL FOR MAXIMIZING RETURN," which was filed on Jun. 2, 2014, both of which are incorporated by reference herein in their entirety.

RELATED FIELD

At least one embodiment of this disclosure relates generally to digital event profile filters based on support vector machines, and in particular to detecting fraudulent electronic transactions or to classifying electronic transactions using the digital event profile filters.

BACKGROUND

Many businesses utilize a computer server system (e.g., one or more computers) to provide a computer-implemented service to their customers. For example, some merchants may implement a website or a cloud-based application on the computer server system to provide a personalized service or a content distribution service (e.g., social networking, video streaming, cloud storage, etc.) directly to their customers. For another example, some merchants may utilize a website or a cloud-based application to sell their own or affiliated products. In these examples, the computer server system may execute a digital event profile filter to identify malicious actions occurring on the computer-implemented services, e.g., to detect fraudulent transactions, fraudulent usage, spamming across service accounts, etc. The computer server system may also execute a digital event profile filter to classify electronic transactions. For example, the computer-implemented services can utilize the digital event profile filter to identify a subset of all electronic transactions or potential electronic transactions to commit resources to (e.g., the computing or memory resources of the computer server system). The computer server system may also execute a digital event profile filter to estimate the likelihood of known outcome based on the digital event profile presented to the filter. For example, a digital event profile could be an electronic record of an individual's past driving records, claim history and model of the vehicle. The digital event profile filter can generate a score that estimate the risk of an individual involved in a car accident. The output of the digital profiler can then be used as an input for computing the insurance premium required for the individual.

The digital event profile filters enable objective data-driven analysis, such as an event classification analysis. An event classification analysis can be used to estimate outcomes of electronic transaction events based on quantifiable features (e.g., attributes, properties, factors and parameters) of the electronic transaction events. For example, the electronic transaction events can include processing an electronic transfer, presenting an electronic advertisement via a computer interface, or opening or closing a service account on the computer server system. The outcomes, for example, can be receiving a processing error, causing a user to purchase a product through the computer interface, causing a user to lodge a complaint, preventing a malicious activity, etc.

These quantifiable features can be measured and/or collected before, concurrently, or after the outcomes occur. In some cases, the estimation involves predicting an outcome that has yet to happen. An example may be predicting whether a marketing email will lead to a product sales. In other cases, the estimation involves uncovering an outcome without direct observation of the outcome, e.g., by analyzing observable features related to the event that produced the outcome. An example may be credit card or email fraud detection.

An electronic transaction event, which may include related sub-events, may be related to an unknown outcome from the perspective of a business entity. Let x (quantifiable features) be an m-dimensional vector (e.g., a total of m quantifiable features), where $x \in \mathcal{R}^m$ represents all the available quantifiable features, including factors that can be measured or used to determine the outcome y of the electronic transaction event. For illustrative purposes, the outcome can be simplify as $y_i \in \{-1,1\}$ for each electronic transaction event. That is, the outcome results in either a positive outcome or a negative outcome for the business entity.

Often, business entities want to be able to focus on the event that has the highest return based on limited resources. A desirable outcome can be a positive one, such as generating a donation from direct mailing, or a negative one, such as fraud detection or the amount of insurance claim made in a car accident. It is also quite often in real-world problems that the set of events that will lead to the desirable outcome is a very small portion of all the events available or possible.

Disclosure Overview

A digital event profile filter can be implemented via a supervised learning classification process. A computer server system can implement the supervised learning process to determine outcomes of electronic transactions based on quantifiable features of an observable electronic transaction event. For example, a supervised learning classification process attempts to learn the unknown input-output relationship (dependency or function) $f_o(x)$ between x and $y_i$ by using training data $\{ \mathcal{X} = [x_i, y_i], i=1, \ldots, n \}$ consisting of n pairs $(x_1, y_1), (x_2, y_2) \ldots (x_n, y_n)$. Under the above simplification, the outcome $y_i$ is considered a binary variable $y_i \in \{-1,1\}$. A linear supervised learning classification process can attempt to learn a weight vector w from the training data, Then w is used to compute the estimated outcome y' from previous unseen data set $x_i$ via $y'_i = \text{sign}(wx_i + b)$. Further, the score $wx_i + b$ is used for ranking the unseen data.

This disclosure involves computer-implemented event classification process that optimizes for cost-effective decision making. For example, the event classification process can utilize a classifier model with a linear kernel, a nonlinear kernel, or a combination thereof. The event classification process can optimize by maximizing a receiver operating characteristic (ROC) curve area while taking reward/cost (k) into account. The disclosed process optimizes the return of electronic transaction activities directly through an event classification analysis. The "return" can represent a fiscal cost associated with the consumption of time and resources to process a particular electronic transaction. In some embodiments, the classifier model can be used to classify non-electronic transactions that have corresponding digital event profiles (e.g., defined by quantifiable features) respectively associated therewith. Embodiments include algorithms to optimize (e.g., by reducing processor time or memory consumption) a computer system to implement the event classification process.

In some embodiments, the event classification process utilize one or more classifier models generated by a model builder engine of a return optimization system. For example, the classifier models can be SVM models. The return optimization system can be a computer system comprising one or more computing devices. The event classification process can be implemented by an event classification engine in the return optimization system.

While occasionally the outcome of an electronic transaction event can be obtained without having a business entity performing any "discover action", often times, the outcome, denoted "y", requires the business entity spending some efforts to discover it. The "discover action" may include a form of derivation, estimation, or prediction, such as in the cases of fraud detection or predictive marketing. This means that the business entity may need to incur some costs related to the discovery process (e.g., through classification analysis). Because of this associated cost, the business entity would like to reduce the number of electronic transaction events to focus on, to determine business outcomes.

However, in many real-world applications, the outcomes of the events are not always valued in the same way in terms of their rewards or costs. For example, in a direct mailing campaign, a recipient of the mail can either respond and make a donation of certain amount, which will become a positive contribution to the return of investment (ROI) of the campaign, or choose not to response and refuse to donate, which means the business incurs the cost of sending out that mail. In this case, the positive contribution can correspond to y being proportional to the contribution. The refusal to donate can correspond to y=−1. Similarly in a fraud detection application, each fraudulent transaction may have a different cost amount (e.g., an authentic transaction having an outcome of y=1, and a fake account having an outcome of y being proportional to the damage caused by the fraudulent transaction).

To incorporate this aspect of the business decision-making context, this disclosure denotes $k=(k_1, \ldots, k_n)$ as the reward or cost associated with the outcome of each event. Some embodiments restrict $k \in \mathcal{R}^n$ and for k to be larger than 0. In this example, $y_i$ is negative to represent the negative impact of the event. In many cases, predicting cost/rewards $(k_1, \ldots, k_n)$ of the event is not what a decision maker in a business ultimately needs, as it is an intermediate step for making a decision. The decision maker, for example, can be a computer application or a person operating a computer system that acts as an agent of a business owner. What a decision maker wants may be a list of events ranked by the events' relative contributions to the return of investment (ROI). The decision maker can then use the relative contributions to prioritize their focus to derive the highest possible return, rather than trying to solve the problem of estimating $k=(k_1, \ldots, k_n)$ accurately. That is, the decision maker may want to make a binary decision on each possible event of whether to focus energy on such an event. In some embodiments, the decision maker can make this kind of binary decisions based on the disclosed event classification engine. The disclosed event classification engine can help the decision maker to achieve the highest return. That is, the classifier models can be used to separate likely negative outcome events from likely positive outcome events.

In some embodiments, the classifier model can be based on a linear kernel. For example, the model builder engine can implement a linear supervised learning process that takes $\bar{x}$, $\bar{y}$ and k as inputs and w as an output. Here, $\bar{x}$ denotes arrays of quantifiable feature vectors for observable events in a training set; $\bar{y}$ denotes an array of outcome labels for the observable events in the training set; k denotes an array of the costs respectively associated with the outcome labels for the observable events in the training set; and w denotes the computed weights associated with the linear kernel. The weights can be used to configure the linear kernel such that the linear kernel can be used to classify new observable events based on such events' quantifiable features. That is, the weights can be used by the event classification engine for evaluating all potential events, and a decision maker (e.g., the return optimization system) can act on events where sign$(wx_i+b)>0$, e.g., where the events likely result in positive outcomes. When resources (e.g., time, processor availability, or computer memory) are limited, a decision maker can use the magnitude of $wx_i+b$ to select the top ranked events to have the highest possible return.

Based on the output w, the decision maker can monitor the overall return of the business activities as:

return=$\Sigma_{i=1}^d y_i k_i$ for all i where sign$(wx_i+b)>0$   Formula (1A)

return=$\Sigma_{i=1}^d y_i k_i$ for top d events based on $(wx_i+b)$   Formula (1B)

It is important to note that a business could be interested in minimizing or maximizing the return as it is defined. To simplify discussion and for ease of illustration, this disclosure uses examples where a business wants to maximize the return. In the case of the business having limited resources to focus only on the top d events, the event classification engine can ensure that the events that give positive outcomes (y=1) and higher outcomes (i.e., k is large), will have the probability of having a larger score of $(wx_i+b)$ than all the events that give negative outcomes. Under this condition, the event classification engine can optimize the return fix the business.

In some embodiments, the event classification engine can facilitate optimizing the return through a metric known as the "Area Under the ROC Curve" or the "ROC area" for measuring the performance of the classifier. The ROC area measures the probability that a data point $x_i$ with a positive outcome $y_i=1$ will have a higher score $(wx_i+b)$ than a point with a negative outcome. However, a standard ROC curve treats each sample equally, i.e. k=1 and all positive outcomes are alike and all negative outcomes are alike, rather than taking each individual $k=(k_1, \ldots, k_n)$ into account when building the classifier models. Embodiments of this disclosure refers to methods of optimizing the ROC area by taking into account the cost k associated with each outcome.

Some embodiments of this disclosure have other aspects, elements, features, and steps in addition to or in place of what is described above. These potential additions and replacements are described throughout the rest of the specification

BRIEF DESCRIPTION OF THE DRAWINGS

FIG. 3 is a pseudo-code block illustrating a method of building a classifier model to estimate an outcome of an event based on quantifiable features of the event, in accordance with various embodiments.

FIG. 5 illustrates a pseudo-code block illustrating an argmax function to be used in the method of FIG. 3, in accordance with various embodiments.

The figures depict various embodiments of this disclosure for purposes of illustration only. One skilled in the art will readily recognize from the following discussion that alternative embodiments of the structures and methods illustrated herein may be employed without departing from the principles of the invention described herein.

DETAILED DESCRIPTION

Figure 1A:
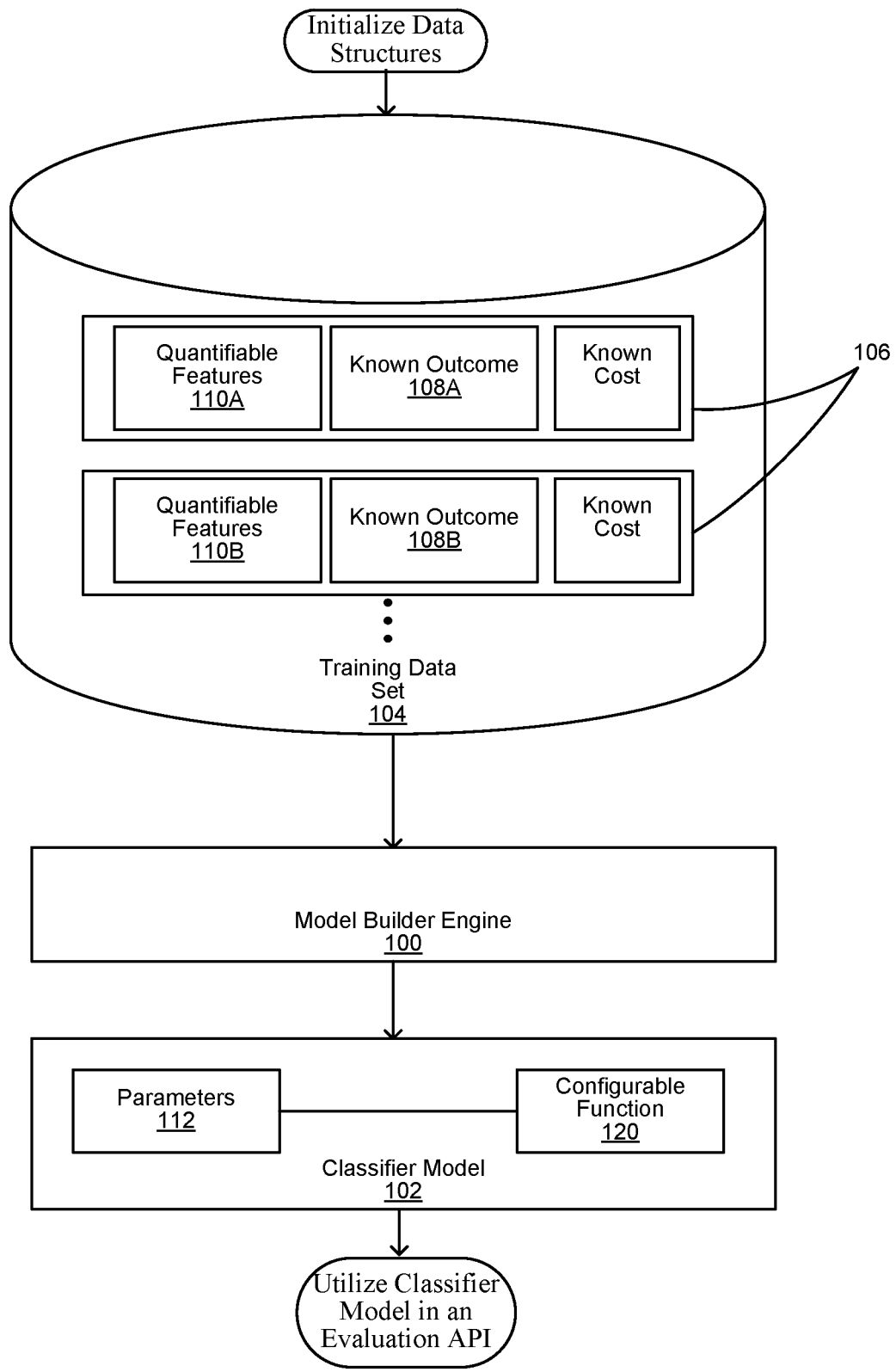
FIG. 1A is a data flow diagram of a model builder engine that generates a classifier model for estimating an outcome based on quantifiable features of an event, in accordance with various embodiments.

FIG. 1A is a data flow diagram of a model builder engine 1100 that generates a classifier model for estimating an outcome (e.g., an outcome in the past, present, or future) based on quantifiable features of an event, in accordance with various embodiments. The model builder engine 100 can be implemented by a computer processor in a computer server system as configured by a set of executable instructions. The model builder engine 100 can instead be implemented by application specific integrated circuit (ASIC), a programmable controller, a field programmable gate array (FPGA), or other electronic circuitry. The model builder engine 100 can train a classifier model 102, such as a supervised learning model, based on a training data set 104 of observable events 106 and known outcomes (e.g., a known outcome label 108A, a known outcome label 108B, etc.; collectively as the "known outcome 108").

The model builder engine 100 is typically instantiated as an active computer process running on a computer server system (e.g., one or more computing devices) with suitable data structures to store the classifier model 102 or the training data set 104. The data structures can be instantiated on one or more memory devices of the computer system. Each of the observable events 106 can include an array of quantifiable features (e.g., quantifiable features 110A, quantifiable features 110B, etc.; collectively as the "quantifiable features 110"). The size of an array of quantifiable features can correspond to the number of dimensions in a feature space (e.g., the types of measurements and attributes associated with an event that can be observed and recorded). The classifier models 102, for example, can be supervised learning models, such as support vector machines (SVMs).

The model builder engine 100 can attempt to create parameters 112 for a configurable function 120 such that the configuration function 120 configured with the parameters 112 can accurately classify the observable events 106 into known categories (e.g., positive or negative) of the known outcomes 108. The configurable function 120 may be referred to as a "kernel." The selection of the configuration function 120 and the parameters 112 may be the basis of the classifier model 102.

The model builder engine 100 can then share the classifier model 102 with, for example, an event classification engine. The event classification engine can be implemented by a computer processor of the computer system as configured by a set of executable instructions. The event classification engine can be coupled to an application programming interface that receives real-time digital event profiles of electronic transaction events in the same feature space as the training data set 104. The event classification engine can then utilize the classifier model 102 to make estimations and/or predictions of potential outcomes of the electronic transaction events.

Figure 1B:
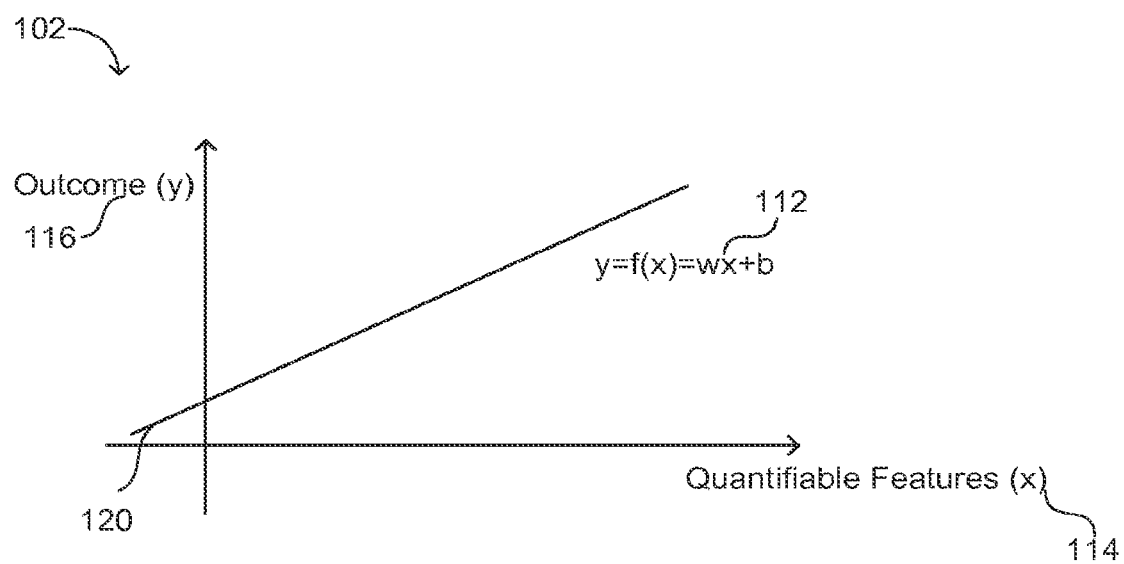
FIG. 1B is a graph illustrating an example of the classifier model of FIG. 1A, in accordance with various embodiments.

FIG. 1B, is a graph illustrating an example of the classifier model 102 of FIG. 1A, in accordance with various embodiments. The classifier model 102 may be embodied as the configuration function 120 configured by the parameters 112. For example, the parameters 112 can be coefficients for a polynomial function, a linear function, or another mathematical function that defines a relationship between one or more variables representing one or more input feature vector 114 of any potential observable event (e.g., including the observable events 106) and one or more variables representing outcome values 116 (e.g., including the known outcomes 108 of FIG. 1A). In this example, the input feature vector 114 has only one dimension; however, in other examples, the input feature vector 114 can be multi-dimensional. Likewise, the parameters 112, such as a linear weight (w), may be multi-dimensional as well.

The model builder engine 100 can configure the parameters 112 such that the configurable function 120 can consistently and accurately, according to a tolerable degree of error, match an observable event, based on its input feature vector, to an outcome value. In the illustrated linear configuration function, the outcome value of an observable event is wx+b, where w (i.e., a linear weight) and b (i.e., a constant threshold value) are part of the computed parameters 112 of the classier model 102.

Figure 2:
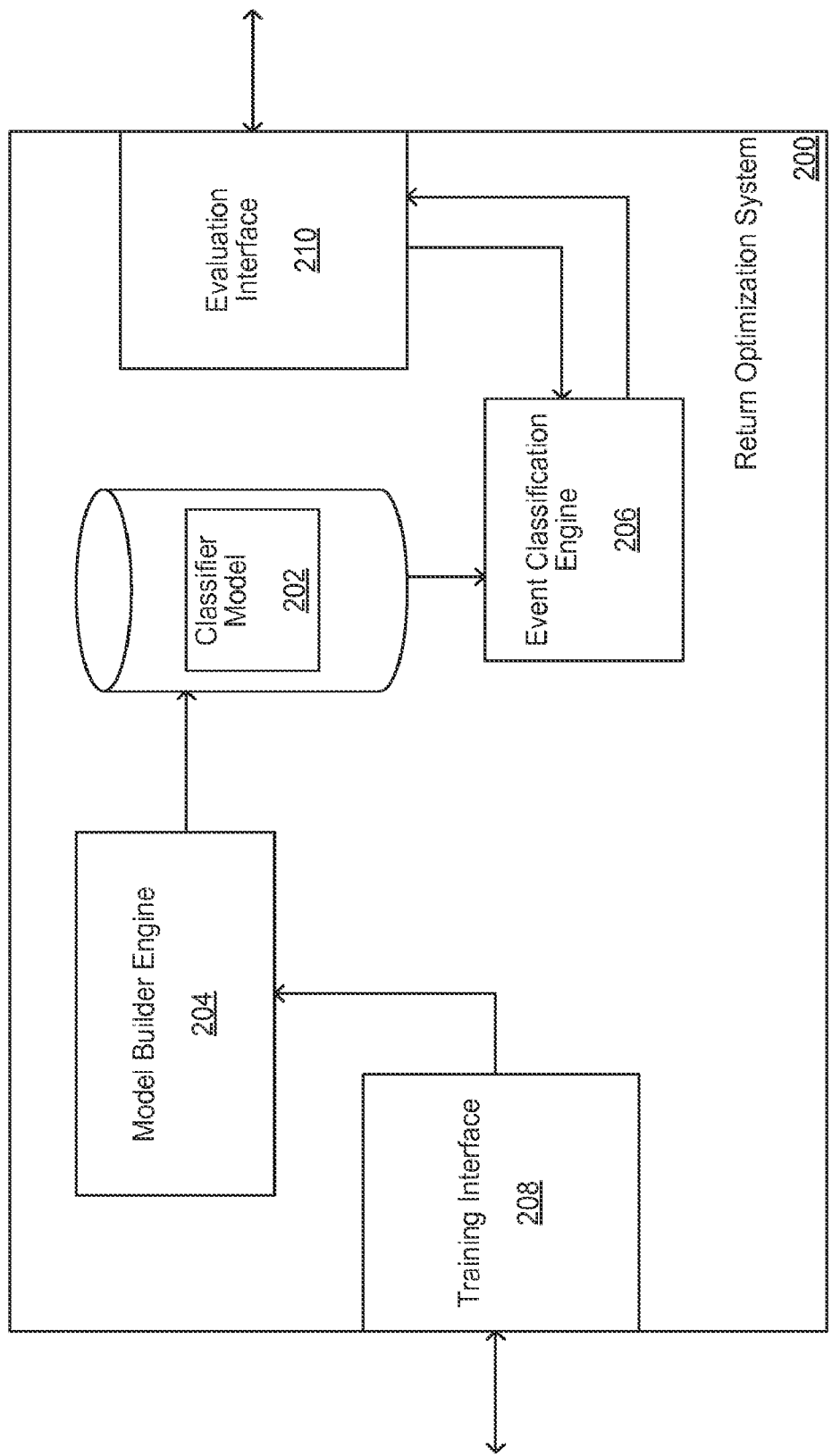
FIG. 2 is a block diagram illustrating a return optimization system that generates one or more classifier models and uses the classifier models to evaluate observable events to optimize business return, in accordance various embodiments

FIG. 2 is a block diagram illustrating a return optimization system 200 that generates one or more classifier models 202, such as the classifier model 102 of FIG. 1A, and uses the classifier models 202 to evaluate observable events to optimize business return, in accordance various embodiments. For example, the return optimization system 200 can be implemented by a computer system comprising one or more computing devices, such as the computer system 800 of FIG. 8 For example, the one or more computing devices can include a desktop computer, a computer server, a virtual computer, an application specific integrated circuit, or any combination thereof. The return optimization system 200 can include a model builder engine 204 (e.g., model builder engine 100 of FIG. 1A) and an event classification engine 206.

The model builder engine 204 may be coupled with a training interface 208. The training interface 208 can be art application programming interface (API), a user interface (e.g., a web-based application), or a combination thereof. The training interface 208 can receive training data set from a client device (e.g., a computer system). The training data set can include a set of observed events including a quantifiable feature vector and a known outcome label for each event.

Based on the training data set, the model builder engine 204 can generate the one or more classifier models 202. Using the one or more classifier models 202, the event classification engine 206 can evaluate observable events to rank the possibility of a positive outcome or a negative outcome. The evaluation interface 210 can be an API or a user interface. In some embodiments, the evaluation interface 210 is integrated with the training interface 208. For example, an evaluation interface 210 can be used to receive observable events. In real time or asynchronously, the event classification engine 206 can classify each observable event as possibly positive or possibly negative. The event classification engine 206 can also rank each observable event by its potential return.

A multivariate SVMs formulation is proposed in Joachims, "A Support Vector Method for Multivariate Performance Measures," *International Conference of Machine Learning* 2005, as follow:

$$\min_{w,\xi} \frac{1}{2} w^T \cdot w + C\xi \qquad \text{Formula (2)}$$

$$\text{s.t.} \quad w^T(\Psi(\bar{x},\bar{y}) - \Psi(\bar{x},\bar{y}')) \geq \Delta(\bar{y}',\bar{y}) - \xi \quad \bar{y}' \in \overline{\mathcal{Y}}/\bar{y} \qquad \text{Formula (3)}$$

Formula (2) is subject to the constraints of the inequality described in formula (3), (Joachims, 2005) describes a SVM formulation based on a linear kernel. Here, $\bar{x}$ denotes an array of quantifiable features for observable events in a training set; $\bar{y}$ denotes an array of outcome labels for the observable events in the training set; and w denotes the weights to be computed to configure the linear kernel to be used as a classifier model. According to the above formulations, the classifier model can classify the observable events in the training set accurately. $\overline{\mathcal{Y}} \subseteq \{-1,+1\}^n$ in is the set of all admissible outcome label vectors. $\overline{\mathcal{Y}}'$ denotes the set of all admissible outcome label vectors excluding the outcome labels known to be correct, i.e., $\bar{y}$. $\Psi$ is a linear function that evaluates the matching between $(y_1', \ldots y_n')$ and $(x_1, \ldots, x_n)$. As proposed by (Joachims, 2005), $\Psi(\bar{x},\bar{y}')$ is restricted as follow:

$$\Psi(\bar{x},\bar{y}') = \sum_{i=1}^{n} y_i' x_i \qquad \text{Formula (4)}$$

As a result of this mapping, (Joachims, 2005) proposed to use the following as prediction rule, $$\bar{h}_w(\bar{x}) = \mathrm{argmax}_{\bar{y} \in \mathcal{Y}} \{w^T \Psi(\bar{x},\bar{y}')\} \qquad \text{Formula (5)}$$

where the prediction rule return the tuple of labels $\bar{y}' = (\bar{y}'_1, \ldots \bar{y}'_n)$ that score the highest according to linear function of Formula (5) and w is the weight vector learn by the learning algorithm. It means if a w that has $w^T \Psi(\bar{x},\bar{y})$ larger than all possible $w^T \Psi(\bar{x},\bar{y}')$ larger than all possible $w^T \Psi(\bar{x}, \bar{y}')$ then it will be considered as classifying all the training data correctly.

This formulation can be used for various cost function $\Delta(\bar{y}',\bar{y})$, such as a ROC curve. However, this formulation (Formula (2)) only has one slack variable $\xi$. This makes the formulation in (Joachims 2005) unable to assign a different weight for every data point. That is, (Joachims 2005) proposes having only a single penalty parameter C for the entire training set instead of each individual data point. The disclosed technology modifies the (Joachims 2005) formulations such that weights for each data point can be individually accounted for.

The disclosed algorithm enables SVMs to account for a different cost for each data point while maximizing the ROC area. The disclosed algorithm can incorporate the cost term of each data point in the training set into the ROC area cost function. This can be understood as if the algorithm expands the size of the training data set, and each data point is expanded according to its cost term k. For example, if a first observable event's outcome is 5 times more valuable than a second observable event (i.e., $k_1 > 5* k_2$, then the first observable event should have five times the presence while training the SVM classifier model.

In preferred embodiments, the disclosed algorithm emulates the expansion of the training data set by weighing data points with different cost terms (k) proportional to the cost/reward associated with the known outcomes in the training data set. The preferred embodiments distinguish over other alternative embodiments in terms of saving computing and memory resources. For example, an alternative embodiment can "expand" a single data point in the training set by replicating that data point multiple times in the training set before feeding the training set into the (Joachims, 2005) formula. However, this alternative embodiment may slow down the calculation significantly. For example, by implementing the alternative embodiment, the modified training data set may hundred or thousand times larger than the original training data set. In the preferred embodiments, the SVM formulation is modified so it can compute the classifier model at substantially similar speed as if working on the original training data set, but at the same time, consider certain data points as if being considered multiple times. In other alternative embodiments, different distance penalties ($C_i$) may be applied to each data point. However, it is noted that the connection between the distance penalty parameters ($C_i$) and the cost/reward of outcome returns ($k_i$) is not a trivial one to estimate. Because the distance penalty parameters penalize the distance of each data point (e.g., represented by a quantifiable feature vector) on the wrong side of the margin in the input feature space, it may be difficult to determine how one can assign $C_i$ based on $k_i$. Some trials and error may be required to get the best distance penalty parameters that accurately represent the cost/reward associated with the known outcomes.

FIG. 3 illustrates a pseudo-code block illustrating a method 300 of operating a model builder engine (e.g., the model builder engine 100 of FIG. 1A or the model builder engine 204 of FIG. 2) to generate a classifier model (e.g., the classifier model 102 of FIG. 1A or the classifier models 202 of FIG. 2) to estimate an outcome based on quantifiable features of an event, in accordance with various embodiments. The classifier model, for example, can be a support vector machine, such as a support vector machine with a linear kernel. For ease of representation, vector variables or matrix variables are bolded in the pseudo-code block. Steps 301-322 illustrate a method of taking, as inputs, various quantifiable feature vectors x and corresponding outcome labels $\bar{y}$ to determine a weight w, as a basis of building a linear model of a support vector machine.

Figure 4:
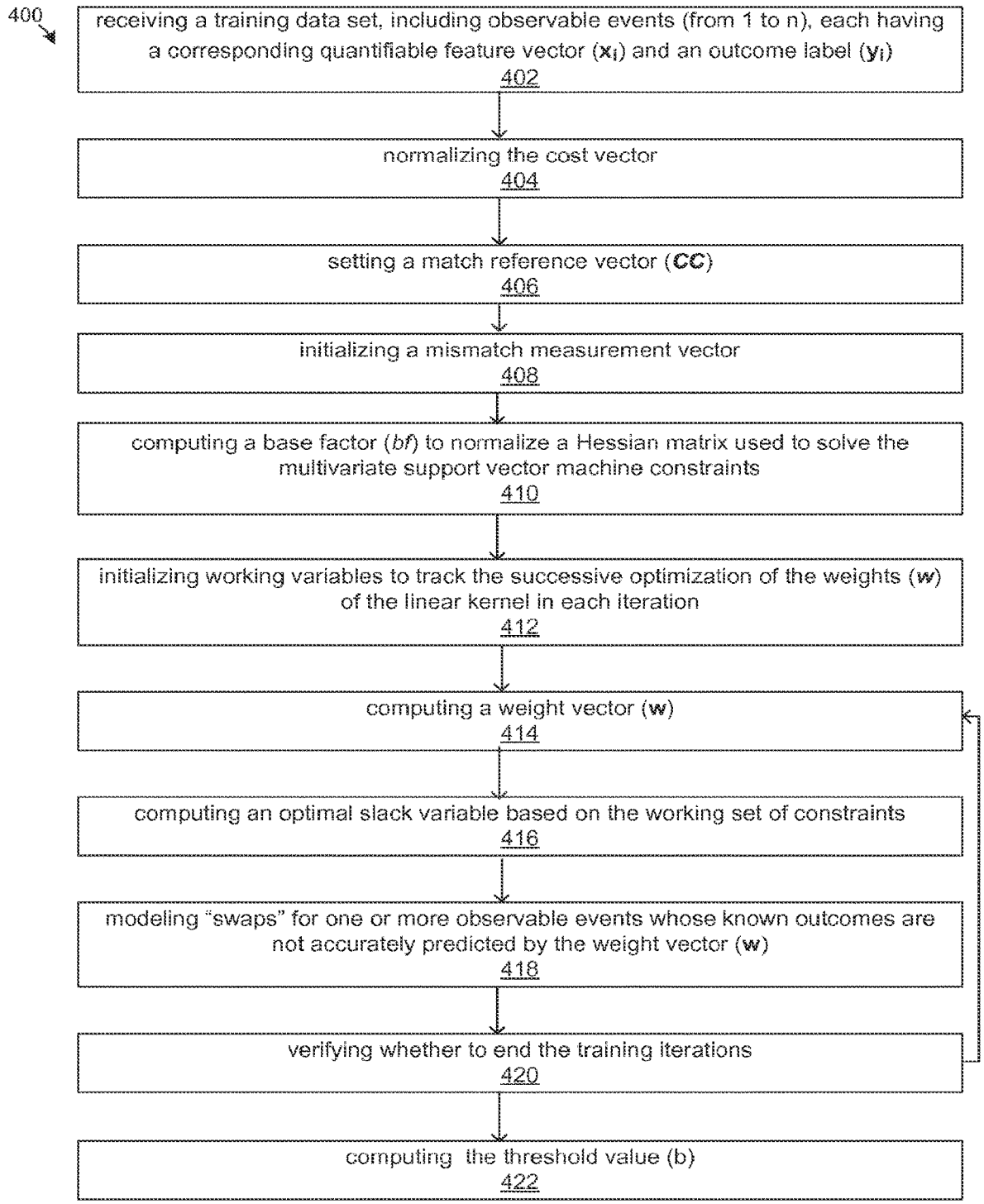
FIG. 4 illustrates a flow chart of the method of FIG. 3, in accordance with various embodiments.

FIG. 4 illustrates a flow chart of the method 300 of FIG. 3, in accordance with various embodiments. The method 402 includes step 402 of receiving a training data set, including observable events (from 1 to n), each having a corresponding quantifiable feature vector ($x_i$) and an outcome label ($y_i$). Step 402 can correspond to step 301 of FIG.

3. The training data set further includes a cost vector, $k=(k_1, \ldots, k_n)$, where each cost corresponds to the outcome label of one of the observable events. The cost can indicate the known return of the known outcome of the observable event.

A computer system that implements the method 300 can import the training data set via an application programming interface coupled to a client computer. The client computer, for example, can be an electronic messaging server that provides messaging events as the observable events; a social networking system that provides computer-implemented social network interaction events as the observable events; or a digital advertisement system that provides advertisement presentations as the observable events; or an electronic insurance policy optimization system that provides historical or simulated electronic claim records as the observable events.

Step 402 can also include receiving threshold settings regarding the classifier model. For example, the model builder engine can select a distance penalty parameter (C) of the classifier model. The model builder engine can also select a ε, corresponding to a stopping criterion. The method 400 can iterate through a set of optimization steps (e.g., steps 414, 416, and 418 until an inequality based on the stopping criterion is met.

Step 404 includes normalizing the cost vector. Step 404 can correspond to step 302 of FIG. 3. The cost vector can be normalized into integer numbers (e.g., by rounding up or down). For example, step 404 can include computing a replacement cost vector by dividing the original cost vector by the minimum cost in the original cost vector.

Steps 406, 408, 410, and 412 involve setting up parametric variables that represent constraints of a support vector machine with a linear kernel. To solve the constraints and optimize the linear kernel, steps 414 through 418 involve iterating through different parameters for the linear kernel function that would solve the constraints. Step 406 includes setting a match reference vector (CC). The match reference vector can be a vector corresponding respectively to the observable events. Each value of the match reference vector can denote a maximum distance between the known outcome of a sample observable event and the estimated outcome according to a worst/perfect configuration of the kernel function of the classifier model Step 406 can correspond to step 303.

The match reference vector (CC) is of size n and every training data point will have its corresponding $CC_i$. To illustrate the role of $CC_i$, consider the case when every $k_i$ is equal to 1. For a given data point $x_i$, $CC_i$ is set at the beginning by counting the number of data points that should have a score $wx_j$ smaller $wx_i$. If $x_i$ has a positive label $y_i=1$, then it means its $CC_i$ should be the number of negative example that is # neg. When $x_i$ has a negative label, then its $CC_i$ should be $-1*\#$ pos, because its score suppose to be "behind" all the positive data points which has a size of # pos. $CC_i$ can also be considered as capturing all the pairwise comparisons between $x_i$ and the data point in the opposite class $x_j$ when all example are rank in the right order.

Following the same trend of thought, step 304 takes the cost into consideration. $CC_i=k_i\Sigma_{j=1}^{\# neg}k_j$ where $y_j=-1$ if ($y_i=1$) takes into the consideration of how much total cost or how many expanded negative data points should be behind a positive data point $x_i$, and this is further weighted by $k_i$ hence $k_i\Sigma_{j=1}^{\# neg}k_j$.

Step 408 includes initializing a mismatch measurement vector ($\overline{CC_g}$). The mismatch measurement vector can correspond to how well the kernel function, as configured by the computed weight vector of each iteration, is estimating the known outcomes. Through each iteration of the machine learning, the mismatch measurement vector is updated and compared against the match reference vector. Step 408 can correspond to step 304. Step 304 set $\overline{CC_1}$ as the exact opposite of the match reference vector in step 303 at the first step, i.e. g=1.

Step 410 includes computing a base factor (bf) to normalize a Hessian matrix used to solve the multivariate support vector machine constraints. The base factor is mathematically optimal to avoid computation errors when using linear algebra and matrix operations to solve the constraints. Step 410 can correspond to step 305.

Step 412 includes initializing working variables to track the successive optimization of the weights (w) of the linear kernel in each iteration. For example, an iteration to solve the parameters of the kernel function begins at step 414. Each iteration is indexed by an iteration index (g). The iteration index can track of how many iterations that the model builder engine has progressed. Each iteration can set up the constraints as a set of linear equations with variable functions, including a Hessian matrix ($H_g$), a matching evaluation vector ($f_g$), the distance penalty parameter (C), and the stopping criteria ($\varepsilon$). Each element of the matching evaluation vector $f_g$ with g elements may be computed as $$f_i = \bar{y}^T(cc - \overline{cc_i}) * \frac{0.5}{bf}$$

where i=1...g. The matching evaluation vector can measure how close the linear kernel is to correctly estimating the outcomes of the observable events in the training data set. Value of $f_i$ can estimate how close the solution ($w_i$) at step i are close to the desirable outcome and fulfill the constraints of the optimization problem.

The Hessian matrix can be computed as $H_g=Z^TZ$, whereas $$z_g = \sum_{i=1}^{n}\left[\frac{cc_i - \overline{cc_i}}{bf}\right]x_i,$$

and $Z \leftarrow Z \cup z_g$. $z_g$ can be considered as an aggregation of all the $x_i$ weighted by how far it is from the perfect solution where it has the correct number of data point ahead (if $y_i=-1$) or behind (if $y_i=1$) based on the size of its ranking coefficient ($s_i$) computed in step 503 of method 500 in FIG. 5.

Step 414 includes computing a weight vector (w) corresponding to a multiplier vector ($\alpha$) that solves a working set of constraints involving the Hessian matrix ($H_g$), a matching evaluation vector ($f_g$), the distance penalty parameter (C), and the stopping criteria ($\varepsilon$). Step 414 can correspond to steps 308-314 of FIG. 3. For example, the weight vector can be computed via the Lagrange multiplier method. The multiplier vector can be represented by the following inequalities:

min L ($\alpha$)=$0.5\alpha^T H\alpha - f\alpha$      Formula (6)

s.t.$\alpha_i \geq 0$      Formula (7)

s.t.$\Sigma_{j=0}^{g}\alpha_j \leq C$      Formula (8)

The weight vector be m-dimensional, where m corresponds to the number of dimensions in the feature space of the quantifiable features. The weights vector can be computed as:

$w=\Sigma_{j=1}^{g}\alpha_j z_j$      Formula (9)

Step 416 includes computing an optimal slack variable based on the working set of constraints. Step 416 can correspond to step 315 of FIG. 3.

Step 418 includes modeling "swaps" for one or more observable events whose known outcomes are not accurately predicted by the weight vector (w). For example, step 418 can include swapping observable events whose predicted outcome has the wrong polarity (e.g., a known positive outcome has a predicted negative outcome or vice versa). For example, step 418 can correspond to step 316 of FIG. 3.

Step 420 includes verifying whether to end the training iterations. Step 420 can correspond to steps 317-321. For example, step 420 can determine whether or not there is any mismatch (e.g., within a pre-configured tolerance represented by the slack variable) between the known outcomes and the outcomes estimated by the weight vector (e.g., step 317). If there is still some mismatch, the model builder engine iterates again (e.g., steps 318-319). When the weight vector of an iteration is able to make a matching estimation, the weight vector (w) is saved as part of the classifier model.

The model builder engine can then compute the threshold value (b) in step 422. In some embodiments, the threshold value is computed using the training data set and the weight vector (w) by iterating through different threshold values using the classifier function of wx+b on the training data set and selecting the threshold value (b) that yields the highest return (e.g., according to Formula 1A). In the case of n-fold cross validation, the threshold value (b) can be computed by using the validation data set that gives the highest possible return.

The method 300 can be implemented as executable instructions to configure a computer processor. The method 300 can be implemented to improve the accuracy of technical fields related to electronic transaction classification, such as electronic fraud detection, digital event profile classification, electronic resource conservation, etc. The method 300 can also advantageously conserve computing resources of a computer server that performs supervised learning to train a support vector machine that is sensitive to the outcome costs of a training data set.

FIG. 5 illustrates a pseudo-code block illustrating an argmax function 500 that can be used in the method 300 of FIG. 3, in accordance with various embodiments. The argmax function 500 can be implemented as a computer algorithm configured to be implemented on a computing device and executed by a computer processor. For ease of representation, vector variables or matrix variables are bolded in the pseudo-code block. Steps 501-515 illustrate a method of taking, as inputs, various quantifiable feature vectors x and corresponding cost vectors k to determine a matching reference vector $cc_1 \ldots cc_n$.

An argmax function, such as the argmax function 500, used in step 316 of FIG. 3, enables the disclosed algorithm to simulate an expanded training data set that weights certain data points multiple times while making sure that the computation cost stays at the similar level as the original training data set. The argmax function 500, for example, can multiply the size of swapping level by the new size $k_i$ while using the expanded size as the basis. This way we can compute the appropriate constraint without having to loop through the expanded data set size. At the same time this achieves the goal of making sure that the cost function takes the appropriate cost of each outcome into account. This is also equivalent of replicated each training data by $k_i$ but without having to increase the computing cost by $\Sigma hd\ i=1^n k_n$. The sum of all $k_i$ where $y_i=-1$ is denoted # neg_exp and the sum of all $k_i$ where $y_i=1$ is denoted # pos_exp.

Figure 6:
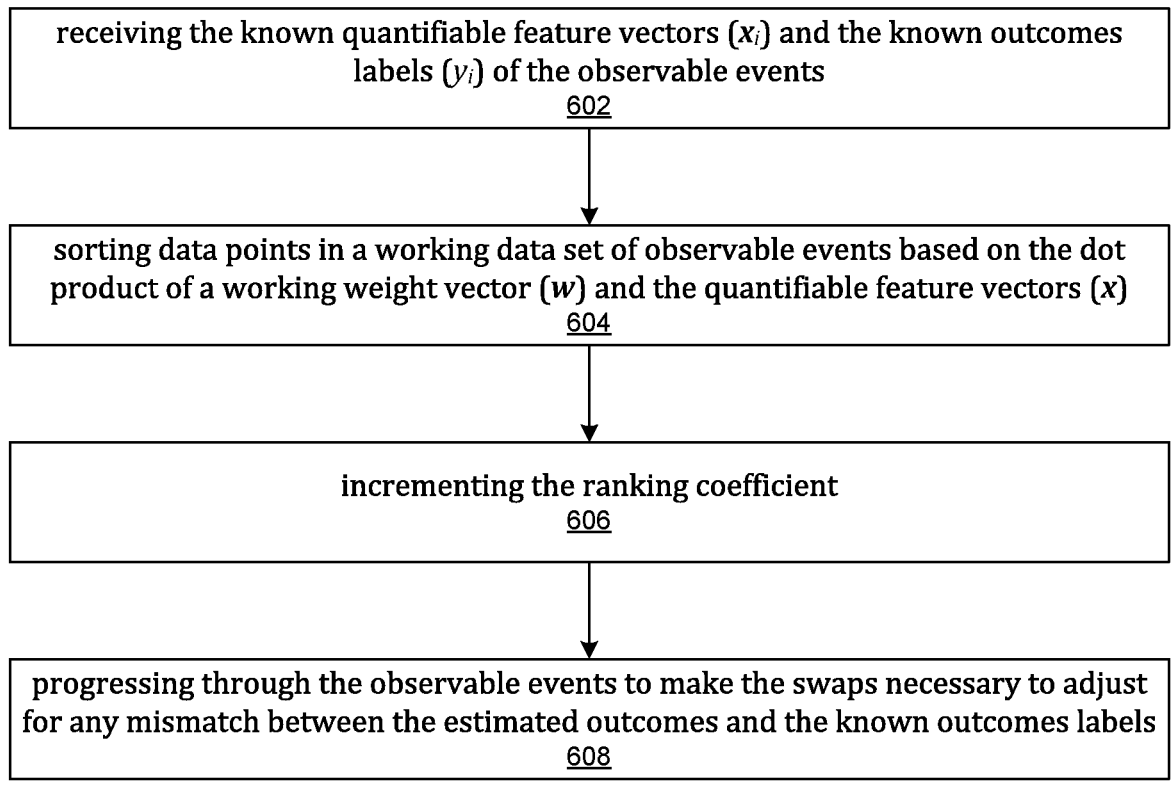
FIG. 6 is a flow chart of a method of implementing the argmax function of FIG. 5, in accordance with various embodiments.

FIG. 6 is a flow chart of a method of implementing the argmax function 500, in accordance with various embodiments. In step 602, the argmax function 500 receives the known quantifiable feature vectors ($x_i$) and the known outcomes labels ($y_i$) of the observable events. There arc maxed function 500 initializes a temporary mismatch measure vector to 0. Step 602 can correspond to steps 501-502.

In step 604, a model builder engine, such as the model builder engine 202 of FIG. 2, sort data points (e.g., represented by quantifiable feature vectors (x)) in a working data set of observable events based on the dot product of a working weight vector (w) and the quantifiable feature vectors (x). In step 604, the index representing the sorted data points in a descending order may be stored in a sorted events vector (r). The model builder engine can first generate ranking coefficient ($s_i$) based on the working weight vector (w) and sort the events vector (r) based on the ranking coefficient. The ranking coefficient can be the expected outcome or an estimation substantially close to the expected outcome. Step 604 can correspond to steps 503-504. In step 606, the argmax function 500 can increment the ranking coefficient.

Step 606 can correspond to step 505 of FIG. 5. This step initialized $s_p$ and $s_n$ variables. Note that $s_p$ is not the same as ranking coefficient ($s_i$). Variable $s_p$ is initialized to be the sum of all the cost for positive examples, and variable $s_n$ is set as 0 at the beginning. These two variables are used to track the aggregated cost of all positive and negative examples that are behind or ahead the data point $x_{r_i}$ between steps 506 to 514. For example, when a negative example is encountered in step 512, the cost term of the example $k_{r_i}$ is added to the $s_n$.

Step 608 progresses through the observable events to make the swaps necessary to adjust for any mismatch between the estimated outcomes and the known outcomes labels. Step 608 can correspond to steps 501-514. This loop goes through each example based on the index $r_i$ in step 504. This means starting from the data point with the highest ranking coefficient ($s_i$) and compute the corresponding $\overline{CC}$ For example, in step 508, the argmax function 500 can compute $\overline{cc}_{r_i}$ for a positive example $x_{r_i}$ based on sum of all k of negative examples ($s_n$) that have a larger ranking coefficient ($s_j$) than $s_{r_i}$. To see why it works, consider a positive data point that has a ranking coefficient larger than every single negative data point's ranking coefficient, i.e. it is ranked perfectly and $s_n$ remain to be 0, then it will have a $\overline{cc}_{r_i} = k_{r_i}$ *#neg_exp which is equal to the match reference vector set (CC) in step 303. Similarly, steps 511 and 512 can compute the negative examples. The argmax function progresses in a loop in steps 506 to 514 from 1 to n (i.e., the size of the training data set). Here, the $\overline{CC}$ is computed as if there are $\Sigma_{i=1}^n k_n$ number of data points. This feature advantageously enables the disclosed argmax function 500 to take various cost term=($k_1, \ldots, k_n$) at individual data level into account.

The disclosed method of building a classifier model improves over various existing supervised learning models. For example, the disclosed model builder engine can build a classifier model that can estimate outcome returns more accurately by taking into account the cost/reward of each observable event in the training data set. The model builder engine can utilize a match reference vector in comparison to a mismatch measurement vector to iterate through different potential weight vectors to identify the most optimal weight vector. These features improve estimation performance when rewards/costs in the training data set are different for different data points. That is, the classifier model can be used to increase the return of investment per decision made on an electronic transaction event as well as the return of investment for an entire business operation.

In some embodiments, the model builder engine is optimized to minimize computation resources. For example, the cost/reward vector is normalized in step 404 such that each cost value is a small integer. The model builder engine can also compute an optimal base factor when solving the constraints of a support vector machine using a Hessian matrix. This base factor (bf) is required and applied in order to ensure the numerical stability of the Hessian matrix. Without the base factor on step 309, the conditional number of the Hessian matrix at step 311 will become too large to find its inverse using a numerical solver, which is required in step 313. Because of the scaling step in 309, original stopping criterion from (Joachims, 2005) is modified to step 317 to have appropriate stopping criterion. This advantageously enables the model builder engine to find the solution efficiently without becoming unstable due to rounding errors. For another example, the argmax function 500 can take k=($k_1$, . . . , $k_n$) into account, without having to work on $\Sigma_{i=1}^n k_n$ number of data point which can be much larger than n. This enables the model builder engine to compute the solution in the same speed as n, but map the data set out to a much larger $\Sigma_{i=1}^n k_n$. In effect, the training data out is expanded to operate as if it is a much larger data set with each data point being replicated $k_i$ time. In several embodiments, all $k_i$, i=1. . . n, values are positive.

Figure 7:
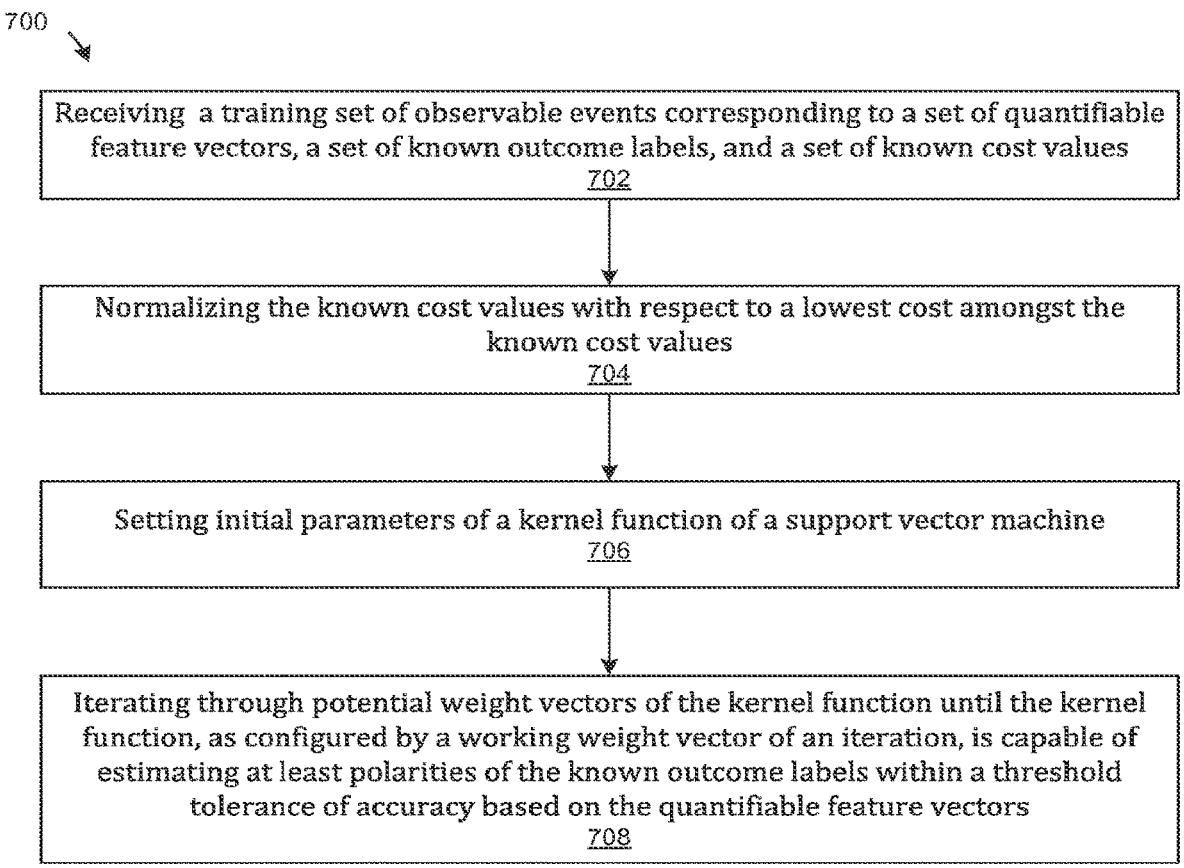
FIG. 7 is a flow chart of a high-level method of training an event classifier model, in accordance with various embodiments.

FIG. 7 is a flow chart of a high-level method 700 of training an event classifier model, in accordance with various embodiments. The method 700 can be the method 300 of FIG. 3. At step 702, a computer system receives a training set of observable events corresponding to a set of quantifiable feature vectors, a set of known outcome labels, and a set of known cost values. The known cost values can quantify known returns associated with the known outcome labels. The known outcome labels can include at least a negative outcome and at least a positive outcome.

At step 704, the computer system can normalize the known cost values with respect to a lowest cost amongst the known cost values. At step 706, the computer system can set initial parameters of a kernel function of a support vector machine. The kernel function can have a linear kernel or a non-linear kernel, such as a Gaussian kernel. Setting the initial parameters can include initializing a match reaiience vector and a mismatch measurement vector. A difference between the match reference vector and the mismatch measurement vector can measure whether the kernel function, as configured by a working weight vector, accurately estimates polarities of the known outcome labels of the observable events.

At step 708, the computer system iterates through potential weight vectors of the kernel function until the kernel function, as configured by a working weight vector of an iteration, is capable of estimating at least polarities of the known outcome labels within a threshold tolerance of accuracy based on the quantifiable feature vectors. Each iteration can include computing the working weight vector in a feature space of the quantifiable features in each iteration by solving variable constraints.

In each iteration, the computer system can re-compute the variable constraints based on the mismatch measurement vector relative the match reference vector. Then, for example, the computer system can compute the working weight vector by performing regression analysis based on the variable constraints in some embodiments, each iteration includes re-computing the mismatch measurement vector while the match reference vector remains constant throughout every iteration. For example, this re-computation can occur at the end of the iteration in some embodiments, the mismatch measurement vector represents a pair-wise loss function. The re-computing of the mismatch measurement vector can include performing swapping pairs based on known ranking amongst the observable events based on the known cost values.

While processes or blocks are presented in a given order, alternative embodiments may perform routines having steps, or employ systems having blocks, in a different order, and some processes or blocks may be deleted, moved, added, subdivided, combined, and/or modified to provide alternative or sitbcombinations. Each of these processes or blocks may be implemented in a variety of different ways. In addition, while processes or blocks are at times shown as being performed in series, these processes or blocks may instead be performed in parallel, or may be performed at different times.

Figure 8:
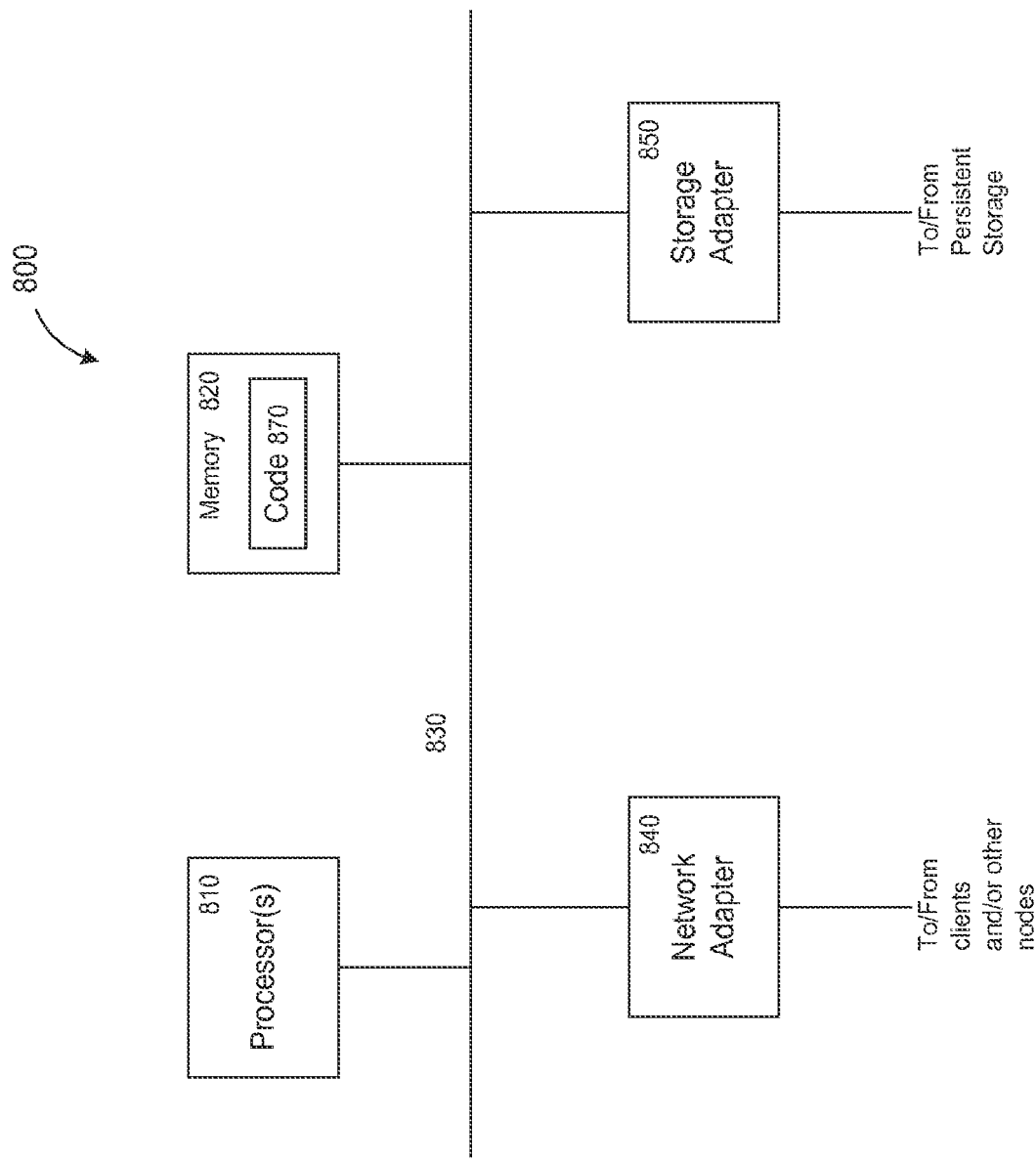
FIG. 8 is a block diagram of an example of a computing device 800, which may represent one or more computing device or server described herein, in accordance with various embodiments.

FIG. 8 is a block diagram of an example of a computing device 800, which may represent one or more computing device or server described herein, in accordance with various embodiments. The computing device 800 can be one or more computing devices that implement the methods and processes described above. The computing device 800 includes one or more processors 810 and memory 820 coupled to an interconnect 830. The interconnect 830 shown in FIG. 8 is an abstraction that represents any one or more separate physical buses, point-to-point connections, or both connected by appropriate bridges, adapters, or controllers. The interconnect 830, therefore, may include, for example, a system bus, a Peripheral Component Interconnect (PCI) bus or PCJ-Express bus, a HyperTransport or industry standard architecture (ISA) bus, a small computer system interface (SCSI) bus, a universal serial bus (USB), (I2C) bus, or an Institute of Electrical and Electronics Engineers (IEEE) standard 1394 bus, also called "Fire:wire", The processor(s) 810 is/are the central processing unit (CPU) of the computing device 800 and thus controls the overall operation of the computing device 800. In certain embodiments, the processor(s) 810 accomplishes this by executing software or firmware stored in memory 820. The processor(s) 810 may be, or may include, one or more programmable general-purpose or spec(al-purpose microprocessors, general-purpose graphics processing units (GPGPU), digital signal processors (DSPs), programmable controllers, application specific integrated circuits (ASICs), programmable logic devices (PLDs), trusted platform modules (TPMs), or the like, or a combination of such devices.

The memory 820 is or includes the main memory of the computing device 800. The memory 820 represents any form of random access memory (RAM), read-only memory (ROM), flash memory, or the like, or a combination of such devices. In use, the memory 820 may contain a code 870 containing instructions according to the mesh connection system disclosed herein.

Also connected to the (processor(s) 810 through the interconnect 830 are a network adapter 840 and a storage adapter 850. The network adapter 840 provides the computing device 800 with the ability to communicate with remote devices, over a network and may be, for example, an Ethernet adapter or Fibre Channel adapter. The network adapter 840 may also provide the computing device 800 with the ability to communicate with other computers. The storage adapter 850 enables the computing device 800 to access a persistent storage, and may be, for example, a Fibre Channel adapter or SCSI adapter.

The code 870 stored in memory 820 may be implemented as software and/or firmware to program the processor(s) 810 to carry out actions described above. In certain embodiments, such software or firmware may be initially provided to the computing device 800 by downloading it from a remote system through the computing device 800 (e.g., vio network adapter 840).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

For very large data set where Memory 820 can not hold, it is possible to have multiple computing device 800 working together to implement the techniques introduced here, by connecting multiple computing devices together via network, and using Message Passing Interface (MPI) or Hadoop to organize the execution of the code 870 in such a way that the optimal (w) will be computed.

Software or firmware for use in implementing the techniques introduced here may be stored on a machine-readable storage medium and may be executed by one or more general-purpose or special-purpose programmable microprocessors. A "machine-readable storage medium," as the term is used herein, includes any mechanism that can store information in a form accessible by a machine (a machine may be, for example, a computer, network device, cellular phone, personal digital assistant (PDA), manufacturing tool, any device with one Or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic," as used herein, can include, for example, programmable circuitry programmed with specific software and/or firmware, special-purpose hardwired circuitry, or a combination thereof.

Some embodiments of the disclosure have other aspects, elements, features, and steps in addition to or in place of what is described above. These potential additions and replacements are described throughout the rest of the specification. For example, the some embodiments include a non-linear kernel.

Extending the Above Algorithms to a Nonlinear Kernel

Several embodiments described above include linear SVM algorithm for optimizing ROC to solve cost sensitive real-world problems. This can be extended to incorporate nonlinear kernel. The reason for the popularity of the kernel method may include the ability of using various kernel function to map the data from original input space into high dimensional feature space S where $\Phi$ represents the mapping of $\mathcal{R}^m \to \mathcal{R}^s$. In this feature space, some embodiments can create a separating hyperplane $f=w^T\Phi(x)+b$ to separate the two classes. However, due to high computation complexity, feature spaces are often not to be computed directly, and much of the SVMs algorithm has been using this "kernel trick" to by pass the computation of the feature spaces, and operate within the original input spaces.

One of the most widely used kernel function is the Gaussian kernel which has the following form:

$$K(x,x_i)=\exp(-[\|x-x_i\|^2])/2\sigma^2$$

where $\sigma$ is the width of the Gaussian kernel, in the rest of the document, the Gaussian kernel is used as an example, but all the method mentioned here is applicable to all positive definite kernels.

For example, Zhang, K., Lan, L., Wang, Z., & Moerchen, (2012), "Scaling up Kernel_ SVM on Limited Resources: A Low-rank Linearization Approach," Proceedings of the 15th International Conference on Artificial Intelligence and Statistics (AISTATS), proposes a method based on low rank approximation of the kernel matrix using Nyström method that explicitly transform the data points in high dimensional space into a linear space, and then the linear SVM algorithm can be applied to solve the kernelize SVM.

Given a training data set's feature vectors $X_n=[x_1, \ldots x_n]$, some embodiments can compute the n×n kernel matrix $K_n$ based on the training data, and the empirical kernel maps for each of the data point, $K_{ij}=\langle \phi(x_i), \phi(x_j)\rangle = \langle u_i, u_j\rangle$.

In this case $u_i$ is an n×1 vectors, this can be viewed as the original $x_i$ are being mapped into $u_i$. In most of the practical problem, the dimensionality of $u_i$ is much larger than in, as most problems have much more number of data point then number of features. To compute $u_i$, one has to find out the eigenvalue decomposition of the kernel matrix $K_n$.

$$K_{nn}=V_n D_n V_n^T$$

where $V_n$ of size n×n consist of the eigenvectors of the kernel matrix, and $D_r$ is a diagonal matrix of eigenvalues. The empirical mapping are computed as follow, $U_n=V_n D_n^{-1/2}$ where $u_n$ is a n×n matrix. However computing the eigenvalue decomposition of the full kernel matrix is often very expensive. A very popular method to overcome this problem is the Nyström method, it produces a rank-k approximation of the kernel by choosing a subset Z of size k from the training data set $X_n$ and then compute the rank-k approximated kernel by, $\tilde{K}_{nn}=K_{nz}K_{zz}^{-1}K_{nz}^T$, where $K_{zz}^{-1}$ is the inverse of the kernel matrix for the subset Z and $K_{nz} \in R^{n \times k}$ is the kernel matrix of $X_n$ and $X_z$. And the rank-k approximation for the empirical kernel mapping is, $\tilde{U}_n=K_{nz}V_z D_z^{-1/2}$, where $\tilde{U}_n$ is n by z matrix instead of the full empirical mapping $U_n$. Each row of $\tilde{U}_n$ is basically correspond to a $x_i$ being transformed.

So to use the linear algorithm outline in the previous section for solving nonlinear problem, one need to supply $\tilde{U}_n$ as the input to Algorithm 1 instead of x̃. How good the rank-k approximated $\tilde{U}$ is determined by the way Z being selected and computed. It is important to select a good set of Z so that the approximation is not too far from the exact solution, hence it will have a better classification performance.

In (Zhang, Lan, Wang, & Moerchen, 2012), a method of using a constant steps k-mean clustering method is proposed for selecting the subset Z. Basically, at the beginning, they randomly select k data points, then perform k-mean clustering for a small number of steps say five, then use the centers as the subset Z in the Nyström method. And one key factor for reducing the computation complexity is to have a small number of subset Z but still achieve a good coverage of the entire training data set to have a good approximation of the $U_n$.

While this approach works fine for data set when the following three conditions are made:
1. Data set is balanced for all lasses, i.e. each class is about the same size.
2. Each data point has equal weight.
3. The dimensionality of the problem is small.

But in practice, when having a data set whose class distribution is not balanced, the weighting for each data point is different and the dimensionality of the problem is high, such an approach may cause instability of the algorithm. By instability, it means for the same kernel parameter such as $\sigma$ and the same size of Z, different result may be produced due to different randomization and how the kmean are computed. Such a behavior is undesirable; as it makes it difficult in practice to select appropriate kernel parameter for SVMs when perform cross validation. A different kmean algorithm from (Zhang, Lan, Wang, & Moerchen, 2012) can be used for selecting the subset Z. And this new subset selection approach is used for the disclosed system/algorithm.

Center Selection Algorithm Using Modified Kmean Clustering

Several embodiments include a center selection algorithm for modified Kmean clustering.

The disclosed system can receives input $\bar{x}=(x_1, \ldots, x_n)$, k, T (number of steps).

The disclosed system can randomly select k data points from $\bar{x}$ as Z. And we denote element of Z as z. An alternative way can draw k data points from $\bar{x}$ based on the relative importance $k=(k_1, \ldots, k_n)$. If $k_1$ five times larger then $k_2$ than it should have five times the chancing of being selected as part of Z. Another alternative is to draw data based on the ratio of total sum of weights between +1 class and the -1 class. Compute the ratio $$r = \frac{\sum_{i=1, y_i \in 1}^{\#pos} \kappa_i}{\sum_{jj=1, y_{jj} \in -1}^{\#neg} \kappa_{jj}},$$

and make the data point with y=1 r times more likely to be selected as part of Z.

The disclosed system can iterate for t=1 to T the following steps.

For each $x_i$ within $X_n$, the disclosed system can assign it to a point $z \in Z$ that has the shortest Euclidean distance to it. Each $x_i$ can only be assigned once to its corresponding z. All the $x_i$ assign to the same z is often referred to as in the same cluster $S_i^{(t)}$ at step t.

The disclosed system can update z according to $$z_i^{t+1} = \frac{1}{\sum_{x_j \in S_i^{(t)}} \kappa_j} \sum_{x_j \in S_i^{(t)}} \kappa_j x_j$$

When the iteration is finished, the disclosed system can output $z_i^{t+1}$ for i=[1 . . . k]

This approach can compute the k-mean cluster based on cost/rewards $k_j$ and bring a much more accurate and stable result than proposed in (Zhang, Lan, Wang, & Moerchen, 2012), when combining with the low rank approximation of the kernel matrix for solving nonlinear problem in linear space.

To extend the disclosed system to solve nonlinear problem, the disclosed system can use the new center selection algorithm on the entire data set. After z is computed, the disclosed system can follow the method outline in (Zhang, Lan, Wang, & Moerchen, 2012) to compute the $\tilde{U}_n$, then $\tilde{U}_n$ is feed into the linear algorithm as $\tilde{x}$, and develop w based on $\tilde{U}_n$.

What is claimed is:

1. A computer system, comprising:
a memory storage device having executable instructions to implement:
a training application programming interface configured to receive a first set of data comprising training observable events, each corresponding to a set of first quantifiable feature vectors, a set of known outcome labels, and a set of known values,
wherein said known values quantify known returns associated with said known outcome labels and wherein said known outcome labels include at least a negative outcome and a positive outcome; and
a model builder engine configured to
provide estimated outcomes of said training observable events using a kernel function, wherein said kernel function is configured by a plurality of parameters including a match reference vector and a mismatch measurement vector, wherein said match reference vector comprises a set of values corresponding to said training observable events, and wherein said mismatch measurement vector comprises a set of values corresponding to said training observable events;
calculate values of said mismatch measurement vector to provide a calculated mismatch measurement vector using said known values, wherein each value of said mismatch measurement vector is calculated from a multiple of the known value of the training observable event corresponding to said each value of said mismatch measurement vector, thereby simulating a second set of data based at least in part on said first set of data, wherein,
for each training observable event with a positive outcome, the corresponding value of said mismatch measurement vector ($\overline{CC}_{r_i}$) is calculated according to
$\overline{CC}_{r_i} \leftarrow (k_{r_i}(\# \text{ neg\_exp}-2*s_n))$
$s_p \leftarrow s_p - k_{r_i}$,
and wherein for each training observable event with a negative outcome, the corresponding value of said mismatch measurement vector ($\overline{CC}_{r_i}$) is calculated according to
$\overline{CC}_{r_i} \leftarrow (k_{r_i}(- \# \text{ pos\_exp}+2*s_p))$ $s_n \leftarrow s_n - k_{r_i}$, and wherein $r_i$ represents an index indicating a rank of said training observable event in a descending order amongst said ranked training observable events, and wherein # neg_exp represents a sum of all known values of said training observable events with a negative outcome and #pos_exp represents a sum of all known values of said training observable events with a positive outcome, and wherein $s_p$ is initially set as a sum of all known values of said training observable events with a positive outcome and $s_n$ is initially set as 0;
calculate a distance between the value of said match reference vector and the value of said calculated mismatch measurement vector corresponding to each training observable event; and
determine accuracy of said kernel function in providing estimated outcomes of said training observable events based at least in part on said distance, wherein said distance indicates how close each estimated outcome is to the known outcome of the training observable event corresponding to said each estimated outcome.

2. The computer system of claim 1, wherein each value of said match reference vector represents a maximum distance between the known outcome and the estimated outcome of the training observable event corresponding to said each value of said match reference vector.

3. The computer system of claim 1, wherein said model builder engine is further configured to
  generate a set of scores corresponding to said training observable events, wherein said scores are generated based on a dot product of a working weight vector and said first quantifiable feature vectors, wherein said working weight vector is one of the parameters of said kernel function; and
  rank said training observable events based on the scores corresponding to said training observable events.

4. The computer system of claim 3, wherein
for each training observable event with a positive outcome, said scores corresponding to said training observable events are generated according to $$s_i = -0.25 + w^T x_i$$

for each training observable event with a negative outcome, said scores corresponding to said training observable events are generated according to $$s_i = 0.25 + w^T x_i$$

wherein $s_i$ is the score of the training observable event having the first quantifiable feature vector ($x_i$) and w is said working weight vector.

5. The computer system of claim 4, wherein said calculation of each value of said mismatch measurement vector is performed by multiplying the known value of the training observable event corresponding to said each value of said mismatch measurement vector by G, wherein G is determined based on the estimated outcome of said corresponding training observable event.

6. The computer system of claim 5, wherein a value of said G is determined to adjust values of said mismatch measurement vector such that a distance between the value of said match reference vector and the value of said mismatch measurement vector corresponding to said training observable event is increased when there is a mismatch between the estimated outcome and the known outcome of said training observable event.

7. The computer system of claim 6, wherein said training observable event is one of (1) said training observable event with a positive outcome scored less than at least one other training observable event with a negative outcome and (2) said training observable event with a negative outcome scored higher than at least one other training observable event with a positive outcome.

8. The system of claim 1, wherein said model builder engine is further configured to apply said calculated mismatch measurement vector to determine a swapping pair, wherein said swapping pair includes at least one of said training observable events.

9. The system of claim 1, wherein said kernel function is used with a support vector machine.

10. The system of claim 9, wherein said kernel function comprises either a linear function or a non-linear function.

11. The system of claim 9, wherein said model builder engine is further configured to iterate through a working weight vector of said kernel function until said kernel function is capable of estimating at least polarities of said known outcome labels within a stopping criterion based on said first quantifiable feature vectors, wherein each iteration includes computing said working weight vector in a feature space of said first quantifiable feature vectors by solving variable constraints.

12. The system of claim 11, wherein said executable instructions further comprise instructions to implement:
  an evaluation application programming interface configured to receive a third set of data comprising query observable events, each corresponding to a set of second quantifiable feature vectors, wherein actual outcomes of said query observable events and actual values quantifying returns associated with said actual outcomes of said query observable events are unknown to said system; and
  an event classification engine configured to evaluate said query observable events.

13. The system of claim 12, wherein said event classification engine is configured to estimate whether each query observable event is to yield a positive outcome or a negative outcome based on said working weight vector and said second quantifiable feature vectors.

14. The system of claim 12, wherein
said event classification engine is configured to determine a ranking of each query observable event amongst said query observable events based on said working weight vector and said second set of quantifiable feature vectors, wherein said ranking represents a relative contribution of corresponding query observable event to a highest return.

15. The computer system of claim 11, wherein said parameters include a threshold value, wherein said threshold value is selected to generate a highest return based on said known values.

16. The computer system of claim 11, wherein said kernel function is a non-linear function, said first quantifiable feature vectors are transformed into a nonlinear space defined by said nonlinear kernel function using a low rank approximation of a corresponding kernel matrix of said kernel function.

17. The computer system of claim 16, wherein said low rank approximation is determined at least in part based on a selected plurality of centers, wherein said centers are a subset of said training observable events selected based on the known values of said training observable events.

18. The computer system of claim 17, wherein said centers are selected by a k-means clustering method.

19. A method comprising:
  receiving a first set of data comprising training observable events, each corresponding to a set of first quantifiable feature vectors, a set of known outcome labels and a set of known values, wherein said known values quantify known returns associated with said known outcome labels and wherein said known outcome labels include at least a negative outcome and a positive outcome;
  providing, using a model builder engine, estimated outcomes of said training observable events using a kernel function, wherein said kernel function is configured by a plurality of parameters including a match reference vector and a mismatch measurement vector, wherein said match reference vector comprises a set of values corresponding to said training observable events, and wherein said mismatch measurement vector comprises a set of values corresponding to said training observable events;
  calculating values of said mismatch measurement vector to provide a calculated mismatch measurement vector using said known values, wherein each value of said mismatch measurement vector is calculated from a multiple of the known value of the training observable event corresponding to said each value of said mismatch measurement vector, thereby simulating a second set of data based at least in part on said first set of data, wherein, for each training observable event with a positive outcome, the corresponding value of said mismatch measurement vector ($\overline{CC}_{r_i}$) is calculated according to $$\overline{CC}_{r_i} \leftarrow (k_{r_i}(\# \text{ neg\_exp}-2*s_n))$$

$$s_p \leftarrow s_p - k_{r_i},$$

and wherein for each training observable event with a negative outcome, the corresponding value of said mismatch measurement vector ($\overline{CC}_{r_i}$) is calculated according to $$\overline{CC}_{r_i} \leftarrow (k_{r_i}(-\# \text{ pos\_exp}+2*s_p))$$

$$s_n \leftarrow s_n + k_{r_i},$$

and wherein $r_i$ represents an index indicating a rank of said training observable event in a descending order amongst said ranked training observable events, and wherein # neg_exp represents a sum of all known values of said training observable events with a negative outcome and #pos_exp represents a sum of all known values of said training observable events with a positive outcome, and wherein $s_p$ is initially set as a sum of all known values of said training observable events with a positive outcome and $s_n$ is initially set as 0;

calculating a distance between the value of said match reference vector and the value of said calculated mismatch measurement vector corresponding to each training observable event; and determining accuracy of said kernel function in providing estimated outcomes of said training observable events based at least in part on said distance, wherein said distance indicates how close each estimated outcome is to the known outcome of the training observable event corresponding to said each estimated outcome.

20. A machine-readable storage medium storing program instructions that, when executed by one or more processors, effectuate operations comprising:

receiving a first set of data comprising training observable events, each corresponding to a set of first quantifiable feature vectors, a set of known outcome labels and a set of known values, wherein said known values quantify known returns associated with said known outcome labels and wherein said known outcome labels include at least a negative outcome and a positive outcome;

providing, using a model builder engine, estimated outcomes of said training observable events using a kernel function, wherein said kernel function is configured by a plurality of parameters including a match reference vector and a mismatch measurement vector, wherein said match reference vector comprises a set of values corresponding to said training observable events, and wherein said mismatch measurement vector comprises a set of values corresponding to said training observable events;

calculating values of said mismatch measurement vector to provide a calculated mismatch measurement vector using said known values, wherein each value of said mismatch measurement vector is calculated from a multiple of the known value of the training observable event corresponding to said each value of said mismatch measurement vector, thereby simulating a second set of data based at least in part on said first set of data, wherein, for each training observable event with a positive outcome, the corresponding value of said mismatch measurement vector ($\overline{CC}_{r_i}$) is calculated according to $$\overline{CC}_{r_i} \leftarrow (k_{r_i}(\# \text{ neg\_exp}-2*s_n))$$

$$s_p \leftarrow s_p - k_{r_i},$$

and wherein for each training observable event with a negative outcome, the corresponding value of said mismatch measurement vector ($CC_{r_i}$) is calculated according to $$\overline{CC}_{r_i} \leftarrow (k_{r_i}(-\# \text{ neg\_exp}-2*s_p))$$

$$s_n \leftarrow s_n + k_{r_i},$$

and wherein $r_i$ represents an index indicating a rank of said training observable event in a descending order amongst said ranked training observable events, and wherein # neg_exp represents a sum of all known values of said training observable events with a negative outcome and #pos_exp represents a sum of all known values of said training observable events with a positive outcome, and wherein $s_p$ is initially set as a sum of all known values of said training observable events with a positive outcome and $s_n$ is initially set as 0;

calculating a distance between the value of said match reference vector and the value of said calculated mismatch measurement vector corresponding to each training observable event; and determining accuracy of said kernel function in providing estimated outcomes of said training observable events based at least in part on said distance, wherein said distance indicates how close each estimated outcome is to the known outcome of the training observable event corresponding to said each estimated outcome.

* * * * *